US012763416B2

(12) United States Patent
Huang et al.

(10) Patent No.: US 12,763,416 B2
(45) Date of Patent: Oct. 13, 2026

(54) BATTERY PACK AND METHOD OF DISASSEMBLING THE SAME FROM ELECTRONIC DEVICE

(71) Applicant: DURQ MACHINERY CORP., Taichung City (TW)

(72) Inventors: Yu-Chia Huang, Taichung City (TW); Fu-Peng Chou, Taichung City (TW)

(73) Assignee: DURQ MACHINERY CORP., Taichung City (TW)

( * ) Notice: Subject to any disclaimer, the term of this patent is extended or adjusted under 35 U.S.C. 154(b) by 511 days.

(21) Appl. No.: 18/498,820

(22) Filed: Oct. 31, 2023

(65) Prior Publication Data

US 2025/0141021 A1 May 1, 2025

(51) Int. Cl.
*H01M 50/262* (2021.01)
*H01M 50/247* (2021.01)

(52) U.S. Cl.
CPC ....... *H01M 50/262* (2021.01); *H01M 50/247* (2021.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 7,999,510 | B2 | 8/2011 | Johnson et al. | |
| 8,354,183 | B2 | 1/2013 | Konuma et al. | |
| 2004/0242043 | A1* | 12/2004 | Buck | H01M 50/204 439/160 |
| 2009/0015195 | A1* | 1/2009 | Loth-Krausser | H02J 7/70 320/107 |
| 2010/0129701 | A1 | 5/2010 | Murayama et al. | |
| 2012/0251229 | A1* | 10/2012 | Liang | H01M 50/213 403/321 |
| 2021/0234225 | A1* | 7/2021 | Takeda | B25D 17/00 |

* cited by examiner

*Primary Examiner* — Carlos Barcena
(74) *Attorney, Agent, or Firm* — MUNCY, GEISSLER, OLDS & LOWE, P.C.

(57) ABSTRACT

A battery pack includes a battery seat and a lock assembly. The lock assembly has a button disposed in the battery seat and has two opposite first inclined surfaces, and two lock members disposed in the battery seat and located at two opposite sides of the button. The lock members each have a second inclined surface abutted against the first inclined surface of the button, such that the lock members are pushed closer to each other by the button to move from a lock position to an unlock position, thus unlocking the battery pack from an electronic device. Thus, the present invention allows a user to hold the battery seat by one hand and operate the button by an index finger of the same hand for achieving an unlocking effect. Further, the present invention provides a method of disassembling the battery pack from the electronic device.

9 Claims, 12 Drawing Sheets

BATTERY PACK AND METHOD OF DISASSEMBLING THE SAME FROM ELECTRONIC DEVICE

BACKGROUND OF THE INVENTION

1. Field of the Invention

The present invention relates to a battery pack for a power tool and more particularly, to an easily disassembled battery pack, and a method of disassembling the battery pack from an electronic device.

2. Description of the Related Art

A battery pack of a traditional power tool usually allows a user to use one finger to press downwards a button or use two fingers to press two plates from both sides at the same time for unlocking the battery pack from the power tool, thus facilitating subsequent charging or replacement of the battery pack, such as US20100129701A1, U.S. Pat. Nos. 8,354,183B2 and 7,999,510B2, etc. However, in actual operation, the user needs to press deeply enough to achieve the unlocking effect and rely on two hands to disassemble the battery pack. Therefore, the traditional battery pack is relatively inconvenient to operate and has room for improvement.

SUMMARY OF THE INVENTION

It is a primary objective of the present invention to provide a battery pack, which is convenient to be disassembled for enhancing convenience of operation.

To attain the above objective, the battery pack of the present invention comprises a battery seat and a lock assembly. The battery seat has a battery mounting chamber inside, a first opening at one end thereof communicating with the battery mounting chamber, and two second openings at two opposite sides thereof communicating with the battery mounting chamber. The lock assembly includes a button, two lock members, and two elastic members. The button is movably disposed in the battery seat and provided with a press portion exposed out of the battery seat through the first opening of the battery seat for being pressed by an external force, and two opposite operating portions located in the battery mounting chamber of the battery seat and each having a first inclined surface. The two lock members are movably disposed in the battery mounting chamber of the battery seat and located at two opposite sides of the button. The two lock members each have a lock portion and a second operating portion provided with a second inclined surface. The second inclined surfaces of the lock members are abutted against the first inclined surfaces of the button, such that the lock members can be pushed closer to each other by the button to move from a lock position to an unlock position. When the lock members are located at the lock position, the lock portions of the lock members are exposed out of the battery seat through the second openings of the battery pack. When the lock members are located at the unlock position, the lock portions of the lock members are retreated into the battery mounting chamber of the battery seat. The elastic members act on the lock members and push the lock members away from the button for keeping the lock members in the lock position.

It can be seen from the above that the battery pack of the present invention allows a user to hold the battery seat by one hand and operate the button easily by an index finger of the same hand for achieving an unlock effect. As such, the battery pack of the present invention can be easily disassembled with one hand for enhancing convenience of operation.

Preferably, the battery seat has two fixed shafts, and the lock members each have a limiting groove. The fixed shafts of the battery seat are inserted into the limiting grooves of the lock members, such that the lock members are moved horizontally from the lock position to the unlock position when pushed by the button.

Preferably, the first operating portions of the button each have a guide post, and the lock members each have a guide inclined slot adjacent to the second operating portion and having an extending direction parallel to an extending direction of the second inclined surface. The guide posts of the button are slidably inserted into the guide inclined slots of the lock members, such that the lock members can be moved stably when pushed by the button.

Preferably, the battery seat has two fixed shafts, and the lock members each have a pivot hole. The fixed shafts of the battery seat are pivotally inserted into the pivot holes of the lock members, such that the lock members are pivoted from the lock position to the unlock position around the fixed shafts when pushed by the button.

Preferably, the battery seat has two guide rails, and the lock members each have a guide slot. The guide rails of the battery seat are inserted in the guide slots of the lock members, such that the lock members can be moved stably when pushed by the button.

Preferably, the battery seat has a bottom base, a top lid mounted to the bottom base to form the battery mounting chamber therebetween and provided with the first and second openings, and a fixed plate fixed to a bottom side of the top lid and provided with two opposite lateral walls. The elastic members each have two ends thereof abutted against one of the lateral walls of the fixed plate and a force-bearing portion of each of the lock members, respectively, such that the elastic members provide elastic forces to the lock members.

Preferably, each of the elastic members is exposed outside through a hollow portion provided by each of the force-bearing portions of the lock member.

It is a secondary objective of the present invention to provide a method of disassembling the battery pack from an electronic device, comprising steps of: a) using one hand to hold the battery seat, b) using an index finger of the same hand to press the button inward to enable the button to move along a first direction from the lock position to the unlock position; and c) disassembling the battery pack from the electronic device.

It can be seen from the above that the method of the present invention allows the user to complete disassembly of the battery pack with one hand, so that it is relatively simple and labor-saving in operation, thus achieving an effect of enhancing convenience of operation.

Preferably, in the step c), the battery pack is disassembled from the electronic device along a second direction opposite to the first direction.

Other advantages and features of the present invention will be fully understood by reference to the following specification in conjunction with the accompanying drawings, in which like reference signs denote like components of structure.

DETAILED DESCRIPTION OF THE INVENTION

Figure 1:
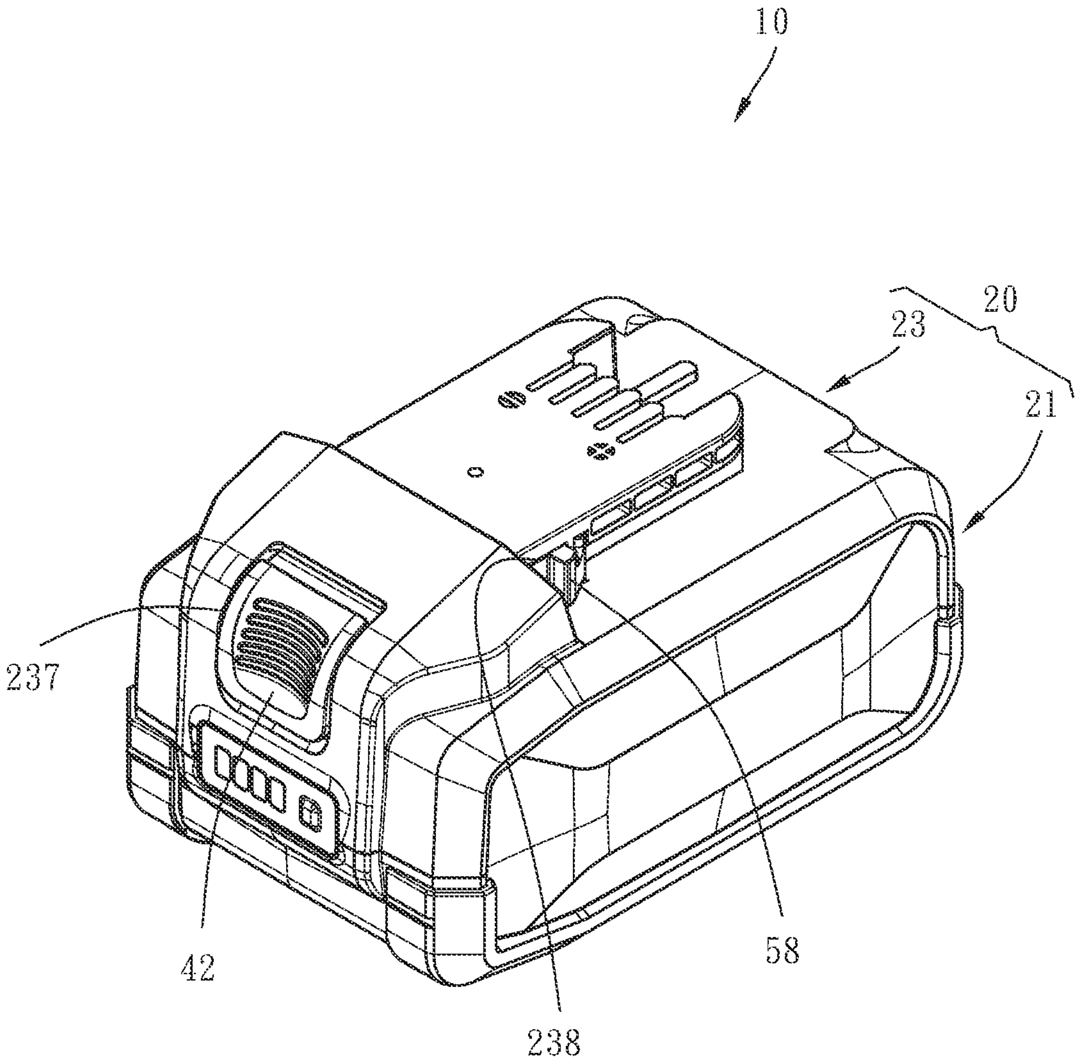
FIG. 1 is a perspective view of a battery pack of a first embodiment of the present invention.
Figure 2:
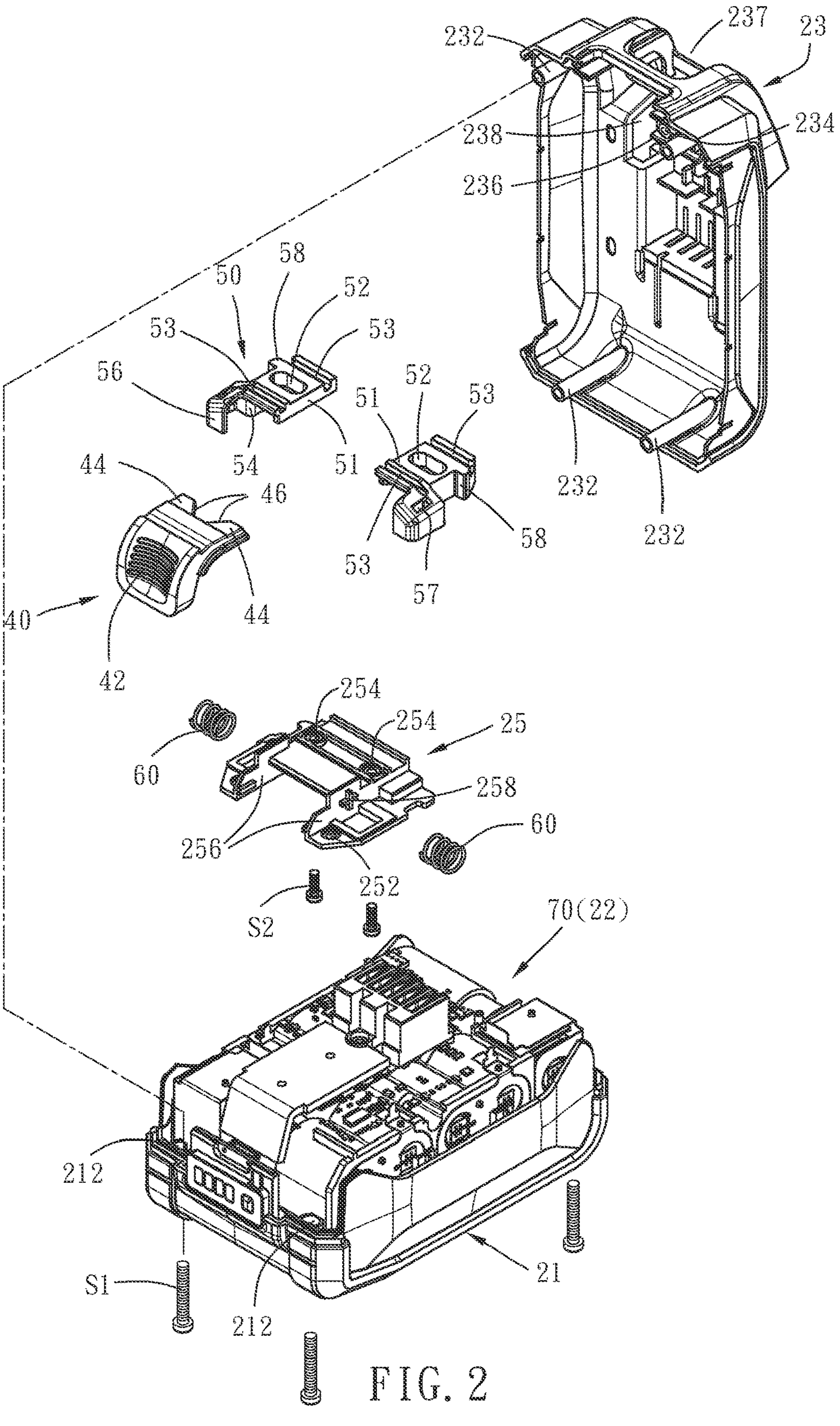
FIG. 2 is a partially exploded view of the battery pack of the first embodiment of the present invention.
Figure 3:
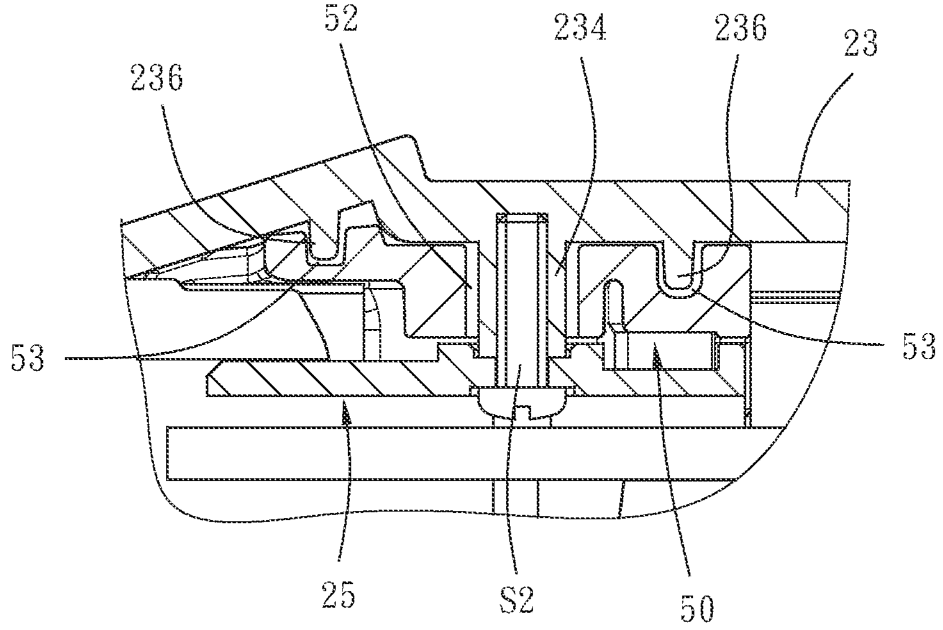
FIG. 3 is a partially sectional view of the battery pack of the first embodiment of the present invention.

Referring to FIGS. 1 and 2, a battery pack 10 of a first embodiment of the present invention comprises a battery seat 20 and a lock assembly 30.

The battery seat 20 includes a bottom base 21 and a top lid 23. Four corners of the bottom base 21 each have a through hole 212. The bottom side of the top lid 23 has four threaded tube portions 232 at four corners thereof, and the bottom side of the top lid 23 has two opposite fixed shafts 234 and two guide rails 236 located at the front and rear sides of the fixed shafts 234. Four screws S1 are penetrated through the through holes 212 of the bottom base 21 from bottom to top and threaded with the threaded tube portions 232 of the top lid 23, such that the top lid 23 and the bottom base 21 are assembled with each other to form a battery mounting chamber 22 therebetween for mounting of a plurality of batteries 70. Further, one end of the top lid 23 has a first opening 237, and two opposite sides of the top lid 23 each have a second opening 238. The first and second openings 237, 238 communicate with the battery mounting chamber 22.

In addition, the battery seat 20 further has a fixed plate 25. The front end of the fixed plate 25 has two opposite first counterbored holes 252 supporting the bottom ends of two of the threaded tube portions 232 of the top lid 23 and penetrated by two of the first screws S1. The rear end of the fixed plate 25 has two opposite second counterbored holes 254 supporting the bottom ends of the fixed shafts 234 of the top lid 23. Two second screws S2 are penetrated through the second counterbored holes 254 and threaded with the fixed shafts 234 of the top lid 23 to lock the fixed plate 25 between the bottom base 21 and the top lid 23.

As shown in FIG. 2, the lock assembly 30 includes a button 40, two lock members 50, and two elastic members 60.

The button 40 is disposed movably forward and backward in the batter seat 20, and provided with a press portion 42 and two opposite first operating portions 44. The press portion 42 is exposed out of the battery seat 20 through the first opening 237 of the battery seat 20 for being pushed by a user. The first operating portions 44 is received in the battery mounting chamber 22 of the battery seat 20 and has a first inclined surface 46.

Figure 14:
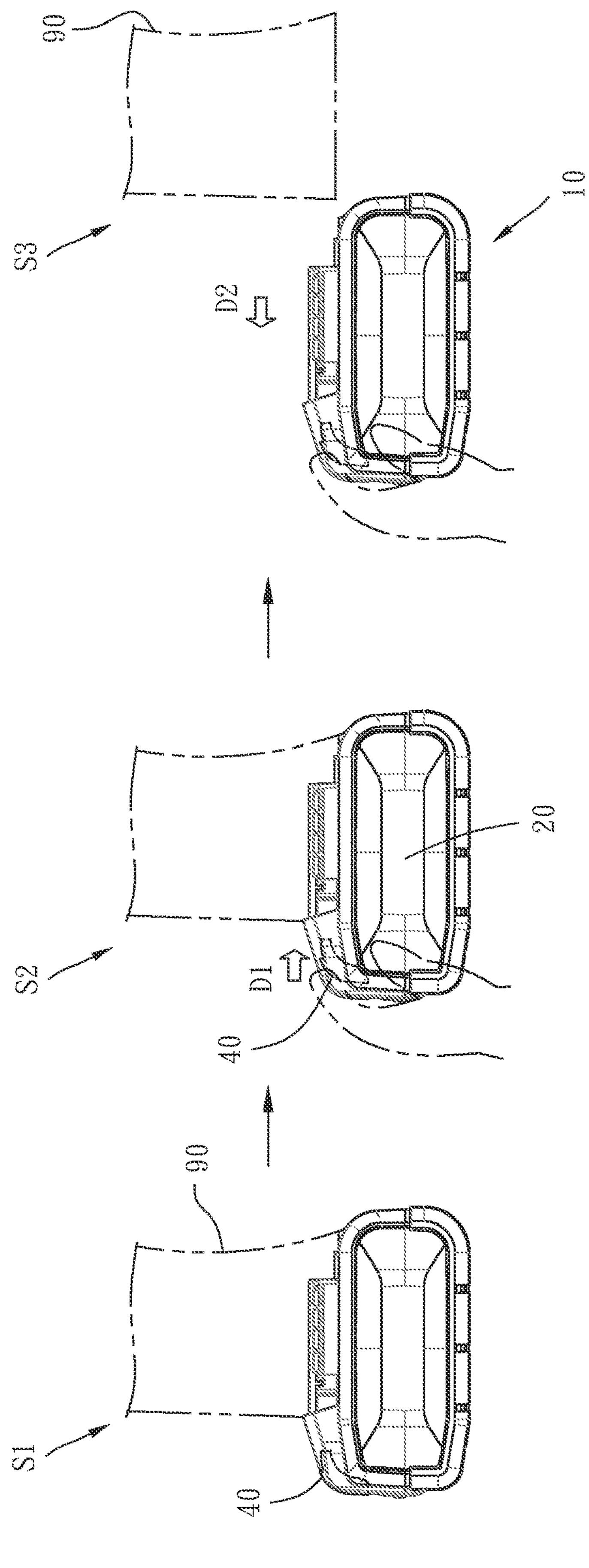
FIG. 14 is a flow chart, showing that the battery pack of the present invention is dissembled from an electronic device.

The lock members 50 are disposed movably leftward and rightward in the battery mounting chamber 22 of the battery seat 20 and located at two opposite sides of the button 40. The lock members 50 each have a base portion 51 provided with a limiting groove 52 penetrated by the fixed shaft 234 of the top lid 23. The top side of the base portion 51 has two guide slots 53 located at the front and back sides of the limiting groove 52 and engaged with the guide rails 236 of the top lid 23. A second operating portion 54 protrudes from the bottom side of the base portion 51 and has a second inclined surface 55 abutted against the first inclined surface 46. The front end of the outer side of the base portion 51 has a force-bearing portion 56 and a hollow portion 57 passing through the force-bearing portion 56. A lock portion 58 protrudes from the rear end of the outer side of the base portion 51 for locking to a corresponding structure of an electronic device 90 (such as a power tool as shown in FIG. 14).

Figure 5:
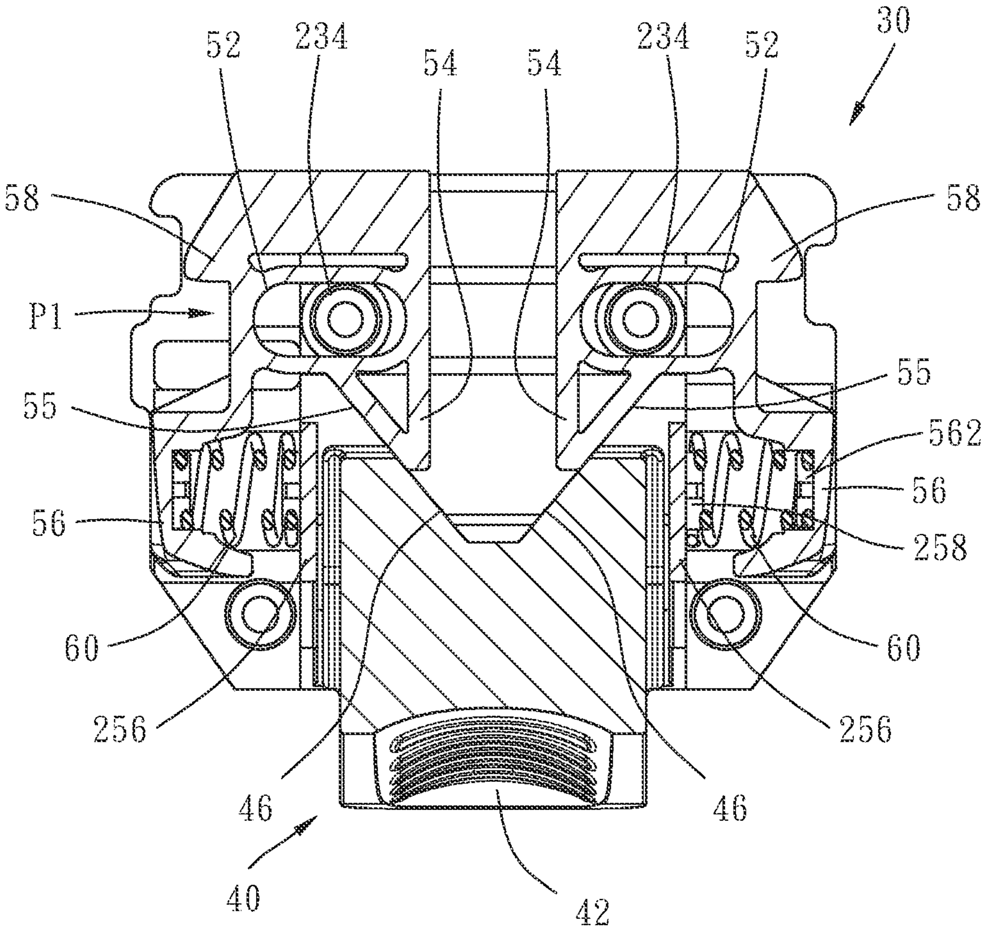
FIG. 5 is a sectional view of a lock assembly provided by the battery pack of the first embodiment of the present invention, showing that the lock members are located at the lock position.

The elastic members 60 are disposed in the battery mounting chamber 22 of the battery seat 20. One end of the elastic member 60 is abutted against a lateral wall 256 of the battery seat 20 and supported by a cross rib 258 formed on the lateral wall 256 (as shown in FIGS. 2 and 5), and the other end of the elastic member 60 is abutted against the force-bearing portion 56 of the lock member 50 and supported by a cross rib 562 formed on the force-bearing portion 56 through the hollow portion 57 of the lock member 50 (as shown in FIG. 5). As such, the elastic member 60 provides an elastic force to push the lock member 50 away from the button 40.

Figure 4:
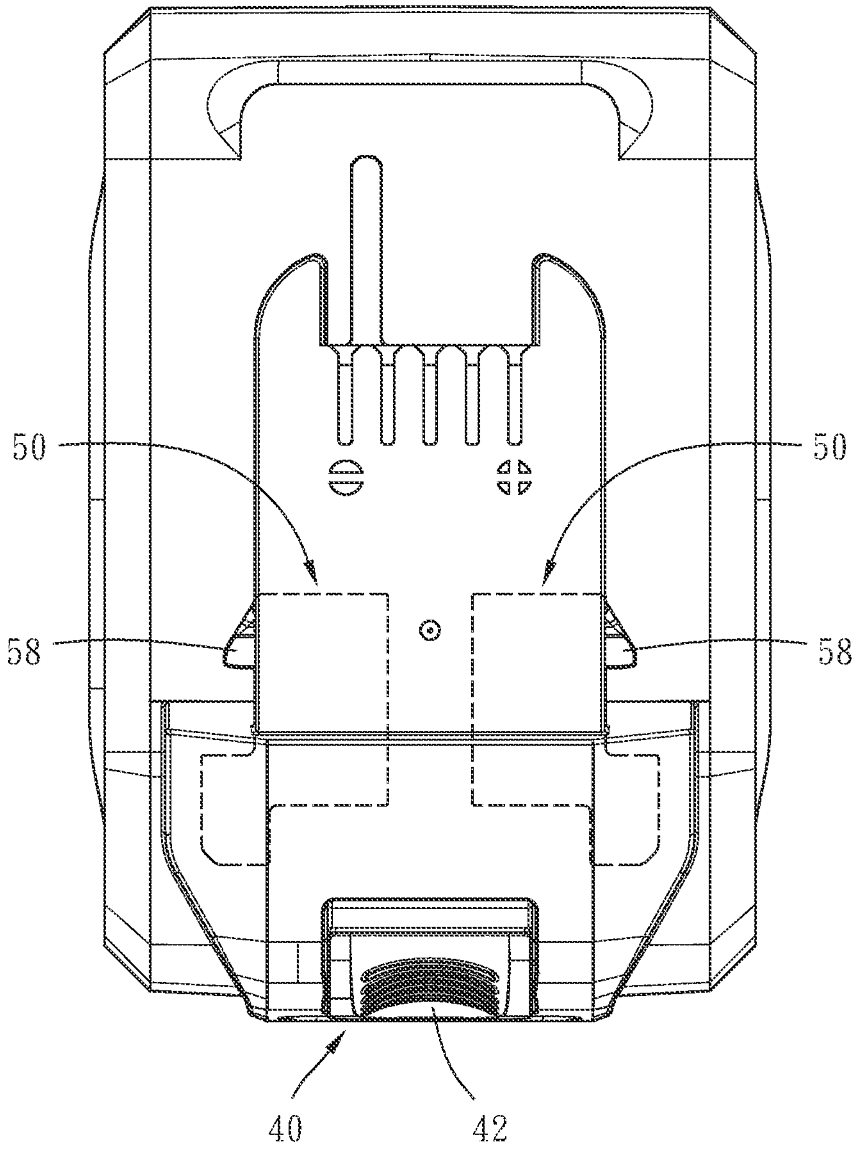
FIG. 4 is a top view of the battery pack of the first embodiment of the present invention.
Figure 6:
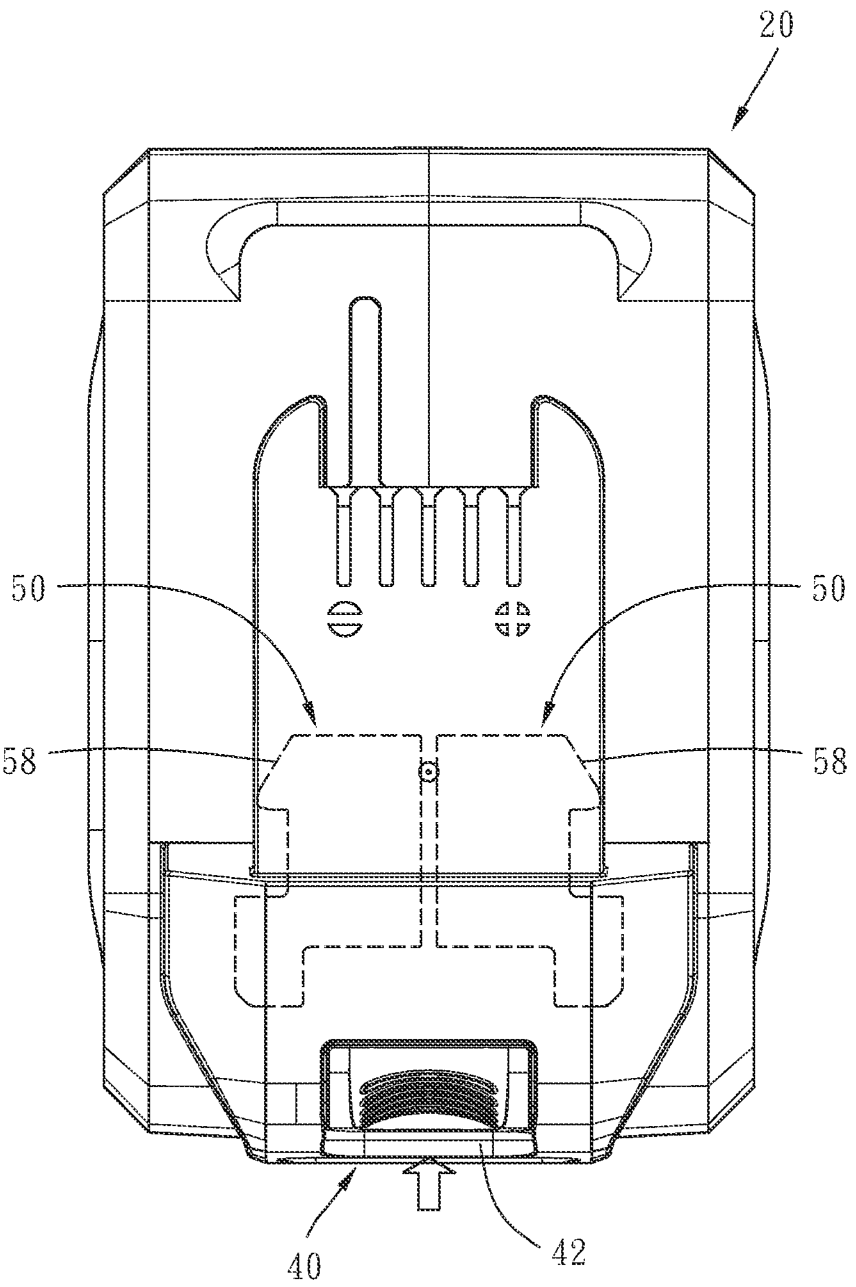
FIG. 6 is similar to FIG. 4, showing that the lock members are located at the unlock position.
Figure 7:
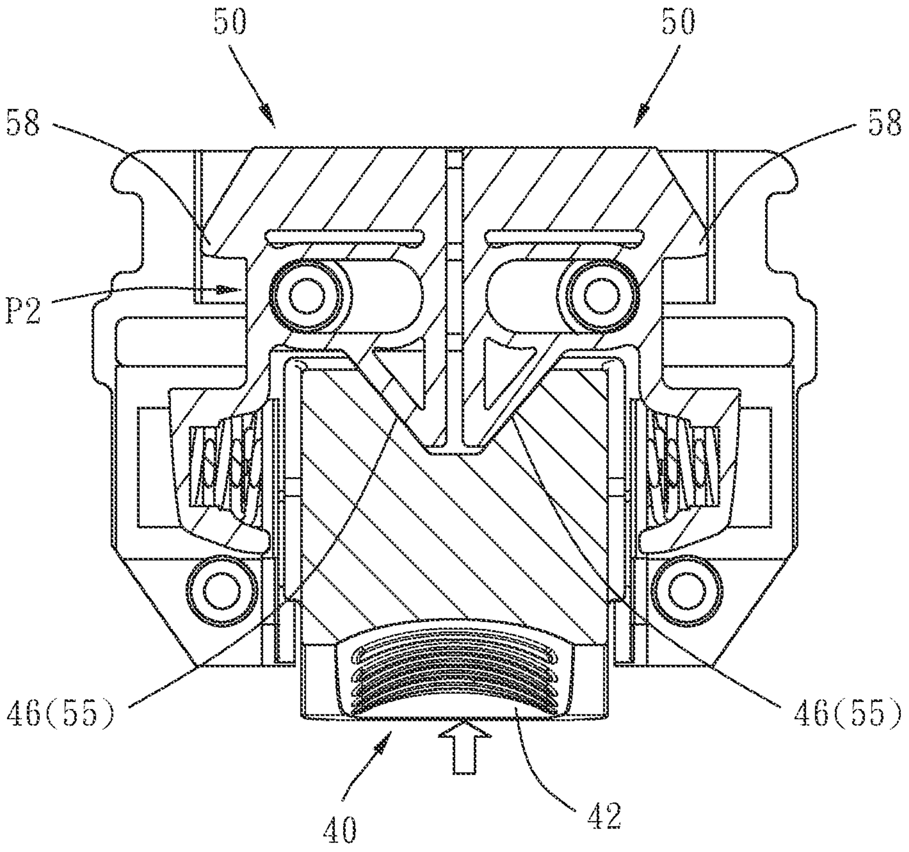
FIG. 7 is similar to FIG. 5, showing that the lock members are located at the unlock position.

It is worth noting that when no external force is applied to the button 40, the lock members 50 are maintained in a lock position P1 as shown in FIG. 5 by the elastic force of the elastic members 60. At this time, the lock portions 58 of the lock members 50 are exposed out of the battery seat 20 through the second openings 238 of the battery seat 20 (as shown in FIG. 4) so as to lock to the electronic device 90, thus enabling the batteries 70 provide power to the electronic device 90. When a user would like to detach the battery pack 10, such as the steps S1-S3 as shown in FIG. 14, the user uses one hand to hold the battery seat 20 first, and then uses an index finger of the same hand to press the button 40 inward to enable the first inclined surfaces 46 of the button 40 to push the second inclined surfaces 55 of the lock members 50 along a first direction D1, such that the lock members 50 are moved horizontally closer to each other from the lock position P1 as shown in FIG. 5 to the unlock position P2 as shown in FIG. 7. At this time, the lock portions 58 of the lock members 50 are retreated into the battery mounting chamber 22 of the battery seat 20 (as shown in FIG. 6). In this way, the battery pack 10 can be disassembled from the electronic device 90 along a second direction D2 opposite to the first direction D1 for facilitating subsequent charging or replacement of the batteries 70. During movement of the lock members 50, the lock members 50 are moved stably by means of engagement between the guide rails 236 and guide slots 53.

Figure 8:
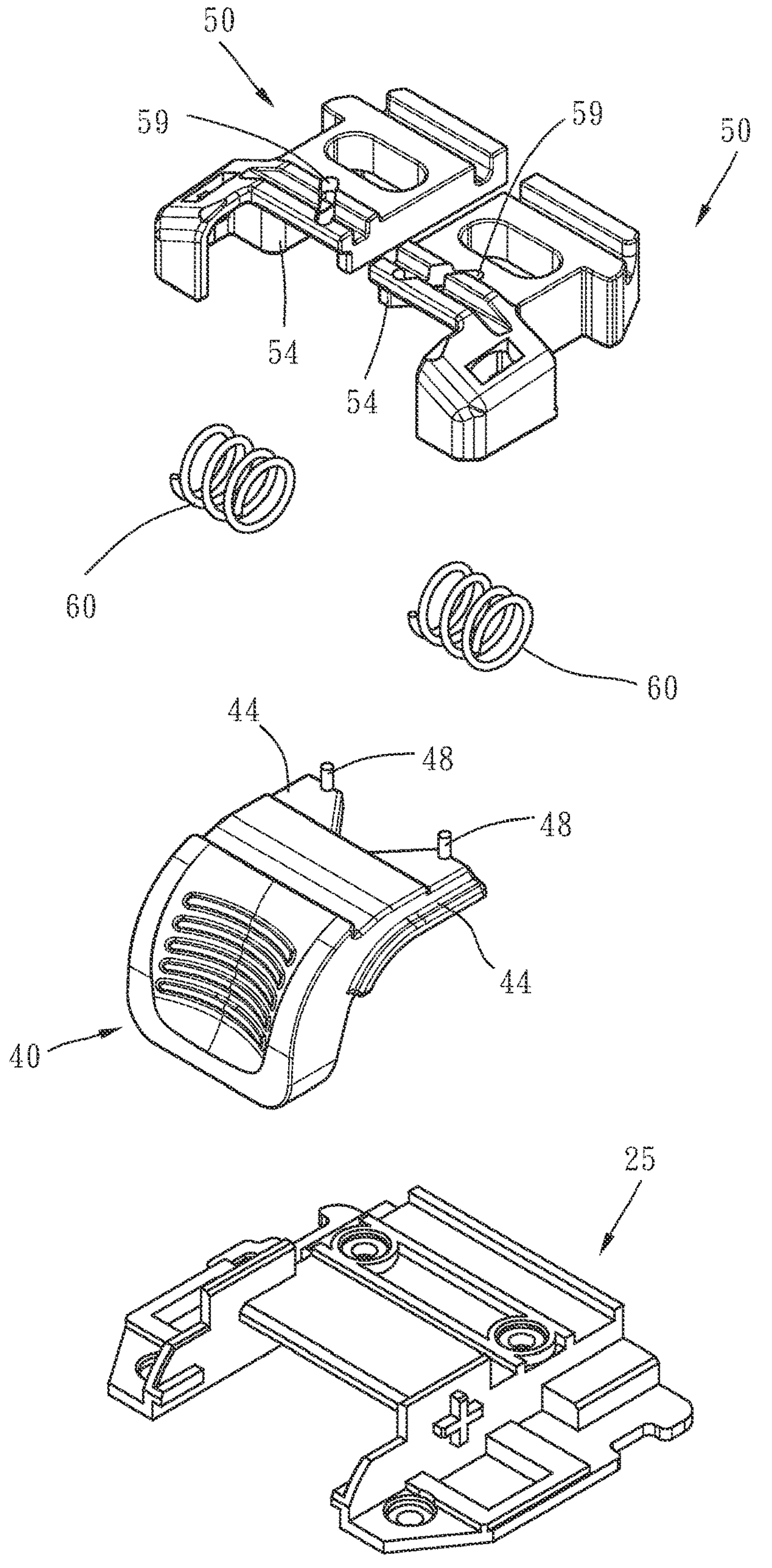
FIG. 8 is a partially exploded view of the lock assembly provided by the battery pack of a second embodiment of the present invention.
Figure 9:
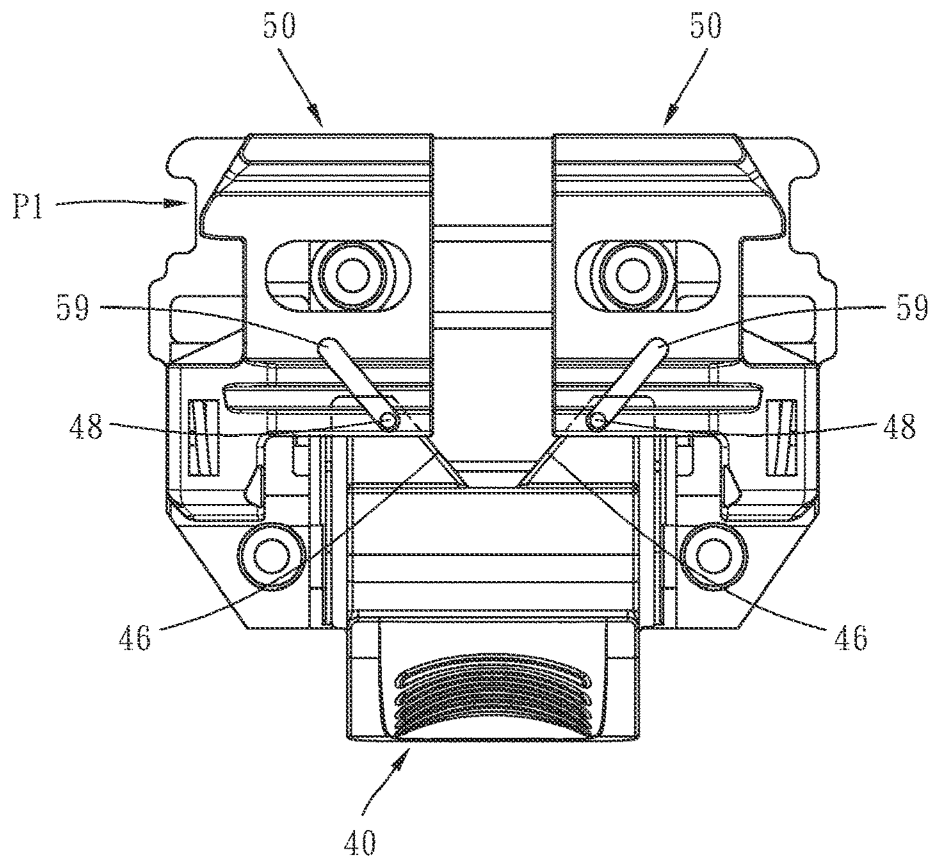
FIG. 9 is a top view of the lock assembly provided by the battery pack of the second embodiment of the present invention, showing that the lock members are located at the lock position.
Figure 10:
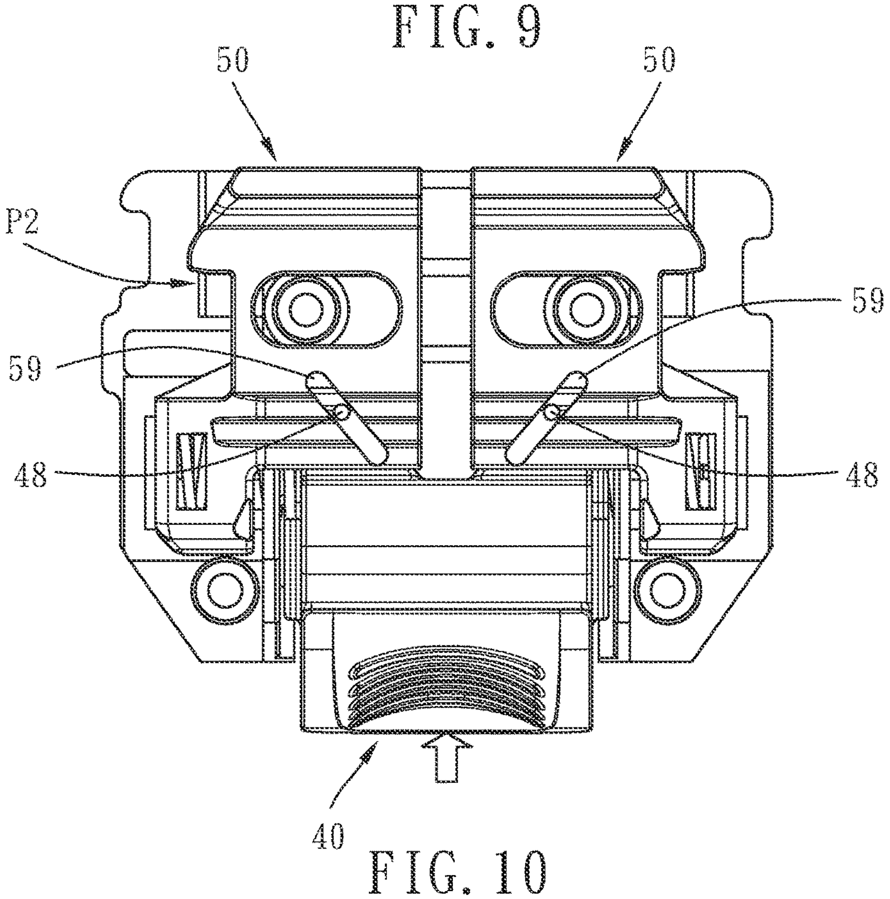
FIG. 10 is similar to FIG. 9, showing that the lock members are located at the unlock position.

As shown in FIG. 8, in order to allow the lock members 50 to move more reliably under pushing of the button 40, in the second embodiment, the first operating portions 44 of the button 40 each have a guide post 48, and the lock members 50 each have a guide inclined slot 59 adjacent to the second operating portion 54. The extending direction of the guide inclined slot 59 is parallel to the extending direction of the second inclined surface 55, and further, the guide posts 48 of the button 40 are inserted into the guide inclined slots 59 of the lock members 50. As such, when the button 40 is pushed by an external force, the first inclined surfaces 46 push the second inclined surfaces 55 on one hand, and on the other hand, the guide posts 48 push the periphery wall of the guide inclined slots 59, such that the lock members 50 can be moved more reliably from the lock position P1 as shown in FIG. 9 to the unlock position P2 as shown in FIG. 10, thus achieving the unlocking effect.

Figure 11:
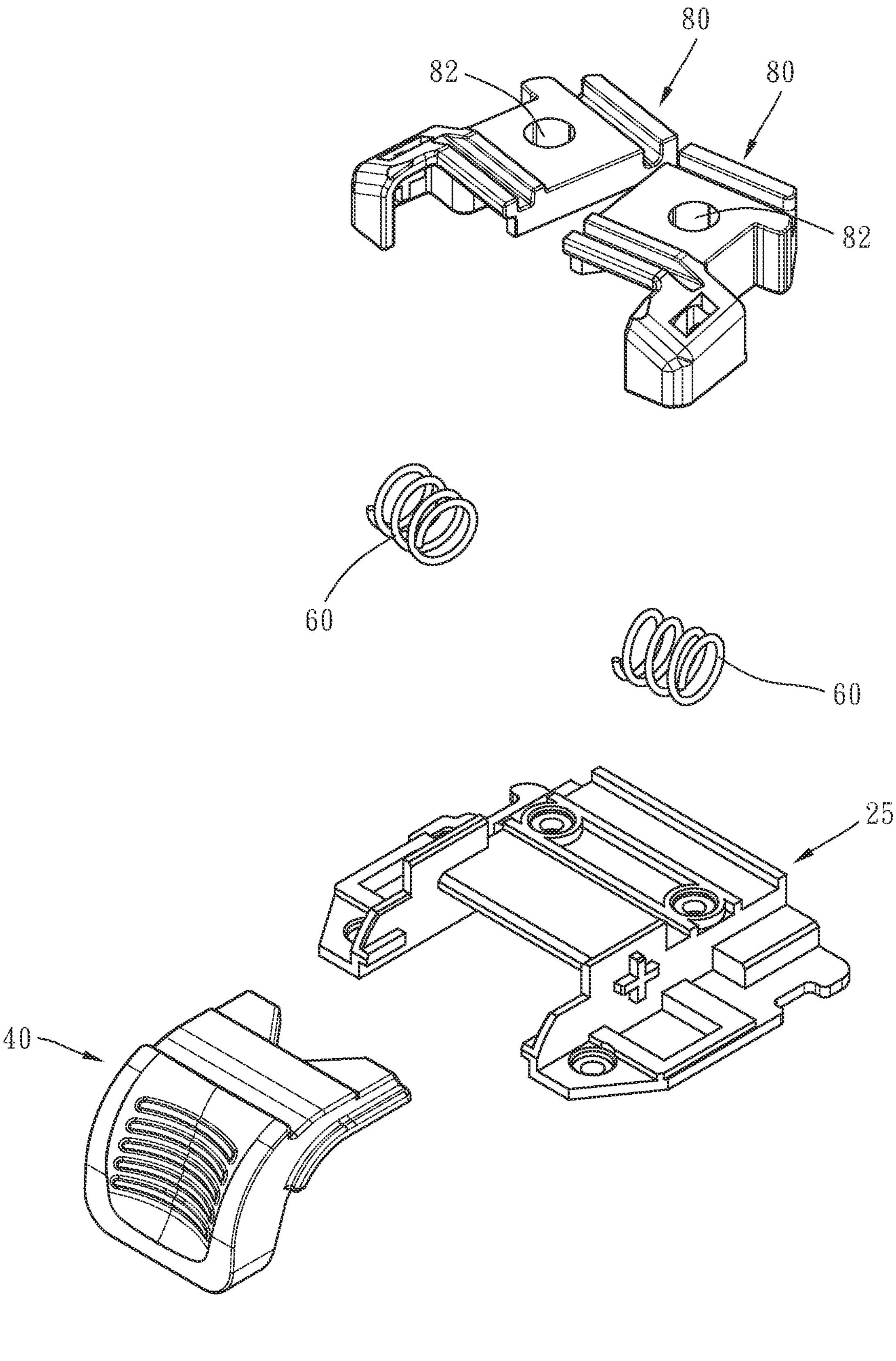
FIG. 11 is a partially exploded view of the lock assembly provided by the battery pack of a third embodiment of the present invention.
Figure 12:
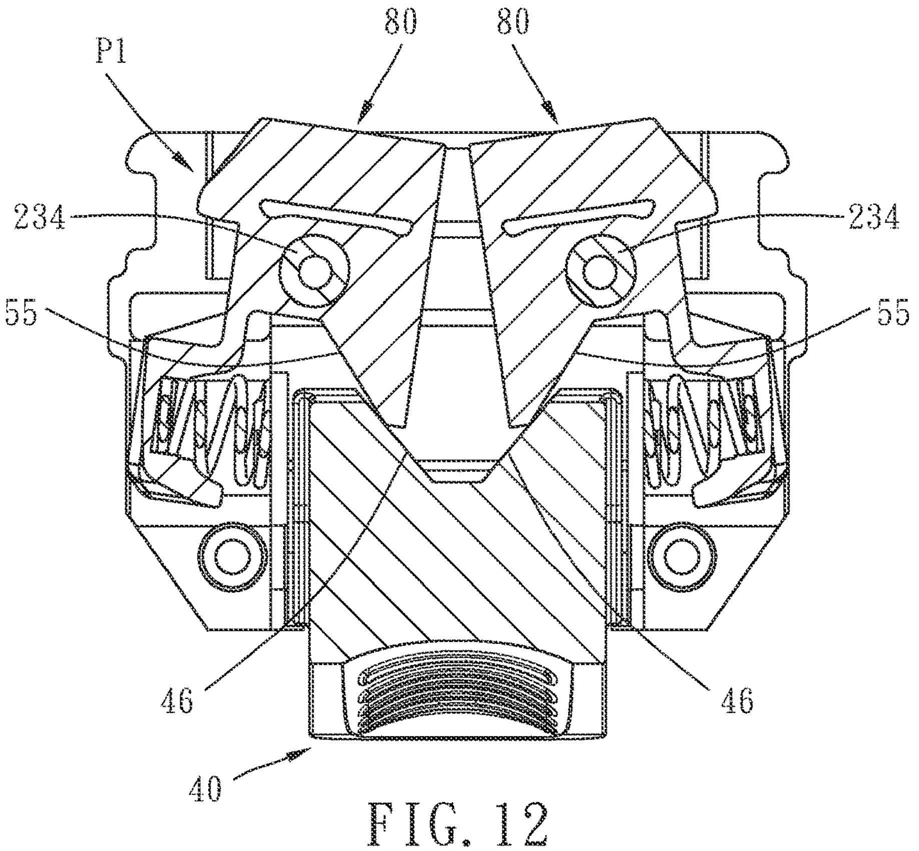
FIG. 12 is a sectional view of the lock assembly provided by the battery pack of the third embodiment of the present invention, showing that the lock members are located at the lock position.
Figure 13:
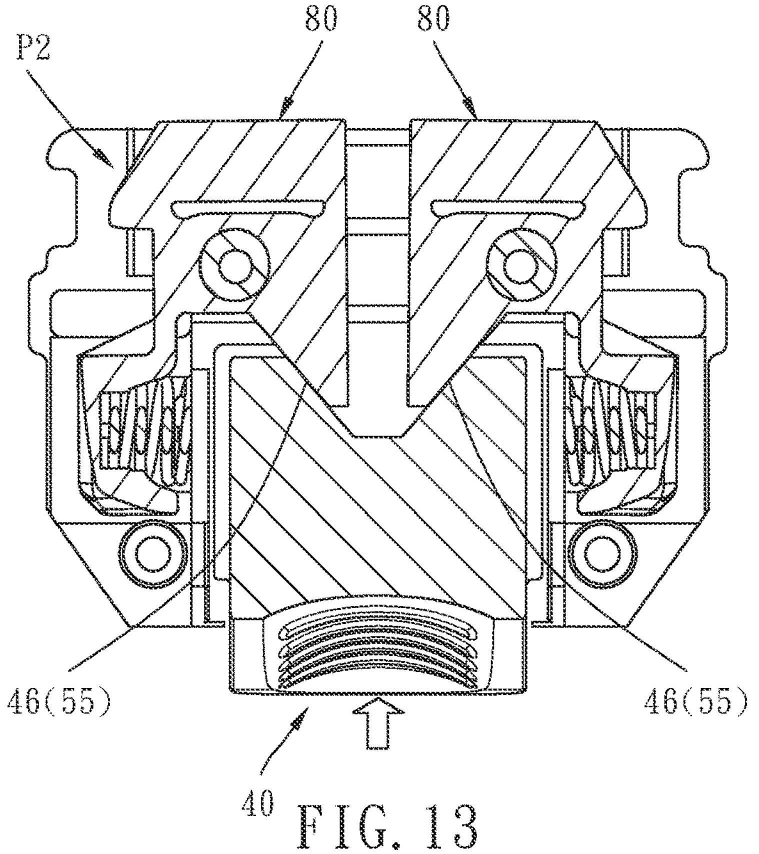
FIG. 13 is similar to FIG. 12, showing that the lock members are located at the unlock position.

As shown in FIG. 11, in the third embodiment, the lock member 80 replaces the limiting groove 52 with a pivot hole 82. The fixed shafts 234 of the top lid 23 are pivotally inserted into the pivot holes 82 of the lock members 80. In this way, when the button 40 is pushed by an external force, the first inclined surfaces 46 of the button 40 push the second inclined surfaces 55 of the lock members 80, so that the lock members 80 are pivoted around the fixed shafts 234 from the lock position P1 as shown in FIG. 12 to the unlock position P2 as shown in FIG. 13, thus achieving the unlocking effect.

As indicated above, the battery pack 10 of present invention allows the user to hold the battery seat 20 by one hand and operate the button 40 by the index finger of the same hand for achieving the unlock effect. As such, the battery pack 10 of the present invention can be easily disassembled with one hand and relatively simple and labor-saving in operation, thus enhancing convenience of operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery pack comprising:

a battery seat having a battery mounting chamber inside, a first opening at one end thereof communicating with the battery mounting chamber, and two second openings at two opposite sides thereof communicating with the battery mounting chamber; and a lock assembly including a button movably disposed in the battery seat and provided with a press portion exposed out of the battery seat through the first opening of the battery seat and two opposite operating portions received in the battery mounting chamber of the battery seat and each having a first inclined surface, two lock members disposed in the battery mounting chamber of the battery seat and located at two opposite sides of the button and each having a lock portion and a second operating portion provided with a second inclined surface abutted against the first inclined surface of the button, such that the lock members can be pushed closer to each other by the button to move from a lock position where the lock portions of the lock members are exposed out of the battery seat through the second openings of the battery pack to an unlock position where the lock portions of the lock members are retreated into the battery mounting chamber of the battery seat, and two elastic members acting on the lock members and pushing the lock members away from the button for keeping the lock members in the lock position.

2. The battery pack as claimed in claim 1, wherein the battery seat has two fixed shafts inserted in two limiting grooves of the lock members, such that the lock members are moved horizontally from the lock position to the unlock position when pushed by the button.

3. The battery pack as claimed in claim 1, wherein each of the first operating portions of the button further has a guide post, and the lock members each have a guide inclined slot adjacent to the second operating portion and having an extending direction parallel to an extending direction of the second inclined surface; the guide posts of the button are slidably inserted into the guide inclined slots of the lock members.

4. The battery pack as claimed in claim 1, wherein the battery seat has two fixed shafts pivotally inserted in two pivot holes of the lock members, such that the lock members are pivoted from the lock position to the unlock position around the fixed shafts when pushed by the button.

5. The battery pack as claimed in claim 1, wherein the battery seat has two guide rails inserted in two guide slots of the lock members.

6. The battery pack as claimed in claim 1, wherein the battery seat has a bottom base, a top lid mounted to the bottom base to form the battery mounting chamber therebetween and provided with the first and second openings, and a fixed plate fixed to a bottom side of the top lid and provided with two opposite lateral walls; the elastic members each have two ends thereof abutted against one of the lateral walls of the fixed plate and a force-bearing portion of each of the lock members, respectively.

7. The battery pack as claimed in claim 6, wherein each of the elastic members is exposed outside through a hollow portion provided by each of the force-bearing portions of the lock members.

8. A method of disassembling the battery pack as claimed in claim 1 from an electronic device, comprising steps of:

a) using one hand to hold the battery seat;

b) using an index finger of the same hand to press the button inward to enable the button to move from the lock position to the unlock position along a first direction; and c) disassembling the battery pack from the electronic device.

9. The method as claimed in claim 8, wherein in the step c), the battery pack is disassembled from the electronic device along a second direction opposite to the first direction.

* * * * *